United States Patent
Tosaki et al.

(10) Patent No.: US 11,646,643 B2
(45) Date of Patent: May 9, 2023

(54) STATOR CORE SUPPORT DEVICE, AND METHOD OF SUPPORTING STATOR CORE

(71) Applicant: TOYOTA JIDOSHA KABUSHIKI KAISHA, Toyota (JP)

(72) Inventors: Masataka Tosaki, Miyoshi (JP); Naoki Kaneshige, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 150 days.

(21) Appl. No.: 17/223,682

(22) Filed: Apr. 6, 2021

(65) Prior Publication Data
US 2021/0359580 A1    Nov. 18, 2021

(30) Foreign Application Priority Data

May 15, 2020    (JP) .............................. JP2020-085935

(51) Int. Cl.
*H02K 15/02* (2006.01)
*B25B 1/00* (2006.01)
*B25B 5/10* (2006.01)

(52) U.S. Cl.
CPC ............. *H02K 15/02* (2013.01); *B25B 5/102* (2013.01); *B25B 1/00* (2013.01)

(58) Field of Classification Search
CPC ... H02K 15/02; B25J 15/0028; B25J 15/0033; B25J 15/0042; B25J 15/026; B23Q 3/06; B23Q 3/062; Y10T 29/53157; B25B 5/102
See application file for complete search history.

(56) References Cited

U.S. PATENT DOCUMENTS 5,360,429 A * 11/1994 Jeanson ............. A61B 17/7055
606/261
2014/0102239 A1 * 4/2014 Umeno ............. G01N 35/0099
294/213

FOREIGN PATENT DOCUMENTS

| JP | S58-000887 U | 1/1983 |
| JP | 2015-089601 A | 5/2015 |
| JP | 2015-231277 A | 12/2015 |
| JP | 2019-129562 A | 8/2019 |

* cited by examiner

Primary Examiner — Tyrone V Hall, Jr.
(74) Attorney, Agent, or Firm — Oliff PLC (57) ABSTRACT

A stator core support device includes two support members that are radially opposed to a stator core such that a central axis of the stator core is interposed between the support members, and an inverting mechanism that inverts the two support members. Each of the support members has a radially opposed face that is radially opposed to the stator core, a first axially opposed face that is axially opposed to a first axial side of the stator core, and a second axially opposed face that is axially opposed to a second axial side of the stator core. While the inverting mechanism is inverting the two support members that hold the stator core, the stator core is moved in the axial direction relative to the two support members.

7 Claims, 7 Drawing Sheets

STATOR CORE SUPPORT DEVICE, AND METHOD OF SUPPORTING STATOR CORE

CROSS-REFERENCE TO RELATED APPLICATION

This application claims priority to Japanese Patent Application No. 2020-085935 filed on May 15, 2020, incorporated herein by reference in its entirety.

BACKGROUND

1. Technical Field

The disclosure relates to a stator core support device, and a method of supporting a stator core.

2. Description of Related Art

A manufacturing apparatus as described in Japanese Unexamined Patent Application Publication No. 2015-089601 (JP 2015-089601 A) is known which performs assembling work in a condition where a stator core is gripped by a chuck.

SUMMARY

In the known manufacturing apparatus, the stator core is not supposed to be vertically inverted. However, if the stator core can be vertically inverted, the stator can be favorably manufactured with high efficiency. For example, in the manufacture of stators including segment coils (rectangular-wire coils), if the stator core can be vertically inverted, operation to insert a plurality of generally U-shaped conductor segments included in the segment coil into slots of the stator core, and operation to bend and weld the conductor segments, may be both performed on the upper side of the stator core, and the stator can be smoothly and efficiently manufactured.

Further, if the stator core can be vertically inverted, in the case where the stator is cleaned on its axially opposite sides, cleaning, such as spraying air to each side to be cleaned, can be conducted in a condition where the side to be cleaned faces downward, no matter which side is cleaned. Thus, it is possible to efficiently let foreign substances fall downward, and efficiently perform cleaning operation. Then, the foreign substances can be prevented from being reattached to the stator core, or the amount of foreign substances thus reattached can be reduced.

In this background, when the stator core is vertically inverted in the known manufacturing apparatus, an excessive load is likely to be applied to a portion of the stator core which is held by the chuck, and the stator core is likely to suffer damage, such as curling, dent, peel-off, etc. of its laminated steel plate.

Thus, this disclosure provides a stator core support device that can invert a stator core while curbing damage, and a method of supporting the stator core.

A stator core support device according to the disclosure includes two support members that are configured to hold a stator core, and are radially opposed to the stator core such that a central axis of the stator core is interposed between the support members, and an inverting mechanism configured to rotate the two support members together at the same time while the support members are holding the stator core, to reverse an orientation of the stator core in a direction of extension of the central axis. Each of the support members has a radially opposed face that is radially opposed to the stator core, a first axially opposed face that is opposed to a first axial side of the stator core in an axial direction of the stator core, and a second axially opposed face that is opposed to a second axial side of the stator core in the axial direction. The second axially opposed face is positioned such that a distance measured in the axial direction from the first axially opposed face to the second axially opposed face is longer than a dimension of the stator core measured in the axial direction. The stator core is configured to be moved in the axial direction relative to the two support members, while the two support members are being inverted while holding the stator core. The first axially opposed face is configured to contact with the first axial side of the stator core, to restrict movement of the stator core to the first axial side, relative to the support members, and the second axially opposed face is configured to contact with the second axial side of the stator core, to restrict movement of the stator core to the second axial side, relative to the support members.

According to the disclosure, the inverting mechanism can reverse the orientation of the stator core along the central axis; therefore, operation or work on the axially opposite sides of the stator during manufacture of the stator can be performed on the upper side of the stator core, for example, and the manufacturing operation can be efficiently performed. Also, cleaning of the stator on the axially opposite sides can be conducted in a condition where the side to be cleaned faces downward, so that foreign substances can be efficiently dispersed downward in the vertical direction, and the stator can be efficiently cleaned. Also, the foreign substances can be advantageously prevented from being reattached to the stator core, or the amount of foreign substances thus reattached can be advantageously reduced.

Further, in a condition where the two support members hold the stator core such that the stator core cannot be detached from the support members, the inverting mechanism inverts the two support members, and reverses the orientation of the stator core along the center axis, while allowing the stator core to move relative to the support members in the axial direction. Thus, unlike the manufacturing apparatus of JP 2015-089601 A, the two support members do not grip the stator core at certain positions with large force, and no excessive force is applied to the stator core during inversion of the stator core. Thus, the stator core is less likely or unlikely to suffer damage, such as curling, dent, peel-off, etc. of its laminated steel plate.

The inverting mechanism may be configured to invert the two support members that hold the stator core of which the central axis extends substantially in parallel with a vertical direction, and the two support members may be configured to hold the stator core such that the stator core is able to radially move relative to the two support members.

With the above configuration, the stator can be manufactured in a condition where the central axis of the stator core is substantially in parallel with the vertical direction. Accordingly, operation or work on axially opposite end portions of the stator can be performed right above or right below the stator, so that the stator can be efficiently manufactured. Also, since the stator core can move relative to the two support members in radial directions, the frictional force applied from the radially opposed faces to the stator core can be significantly reduced during axial movement of the stator core relative to the support members (during inversion of the stator core), and the risk of damaging the stator core can be significantly reduced.

In each of the support members, the coefficient of kinetic friction of the radially opposed face may be smaller than that of the first axially opposed face, and may be smaller than that of the second axially opposed face.

With this arrangement, the stator core can smoothly slide against the two support members during inversion of the stator core. Thus, the stator core can be substantially prevented from or prevented from being damaged.

In each of the support members, the impact-absorbing capability of the first axially opposed face may be higher than that of the radially opposed face, and the impact-absorbing capability of the second axially opposed face may be higher than that of the radially opposed face.

The impact-absorbing capability may be objectively determined by the following method. Specifically, with regard to the first axially opposed face, second axially opposed face, or radially opposed face, a plate-like member made of the same material as each opposed face and having the same thickness no matter which face is concerned is attached onto a floor, and the same spherical member (e.g., a bouncy rubber ball called "superball") is caused to freely fall in parallel with the vertical direction, from the same level, with no initial velocity given thereto. Then, the level of the spherical member is measured (the rebound coefficient is measured) when the spherical member collides with the plate-like member and rebounds. The impact-absorbing capability may be determined to be higher as the level reached by the rebounding spherical member is lower.

With the above arrangement, the impact generated when the stator core collides with the first or second axially opposed face during inversion of the support members is likely to be absorbed by the first or second axially opposed face. Thus, damage of the stator core at the time of collision of the stator core with the first or second axially opposed face can be reduced.

The radially opposed face of at least one of the support members may include a first cylindrical face provided by a part of a first cylindrical inner circumferential surface having a first radius of curvature, and two second cylindrical faces formed on opposite sides of the first cylindrical face in the axial direction. Each of the second cylindrical faces may be provided by a part of a second cylindrical inner circumferential surface having a second radius of curvature that is smaller than the first radius of curvature.

With this arrangement, a stator core having an outside radius that is substantially equal to the first radius of curvature can be held by use of the first cylindrical face, and another stator core having an outside radius that is substantially equal to the second radius of curvature can be held by use of the two second cylindrical faces. Thus, the stator core support device can support two or more stator cores having different outside radii, and the versatility of the stator core support device can be enhanced.

The radially opposed face of one of the two support members may be a flat face.

When both of the radially opposed faces of the two support members are parts of the cylindrical inner circumferential surface, both of the radially opposed faces of the two support members need to be placed on the same cylindrical inner circumferential surface with high accuracy, and the two support members need to be precisely positioned. On the other hand, with the above arrangement, the radially opposed face of one of the support members is a flat face; therefore, the permissible range of the position of the one support member relative to the other support member can be expanded, and positioning of the two support members can be easily accomplished.

A method of supporting a stator core according to the disclosure uses a stator core support device including two support members that are configured to hold a stator core, and are radially opposed to the stator core such that a central axis of the stator core is interposed between the support members, and an inverting mechanism configured to rotate the two support members together at the same time while the stator core is being held, to reverse an orientation of the stator core in a direction of extension of the central axis. Each of the support members has a radially opposed face that is radially opposed to the stator core, a first axially opposed face that is opposed to a first axial side of the stator core in an axial direction of the stator core, and a second axially opposed face that is opposed to a second axial side of the stator core in the axial direction. The second axially opposed face is positioned such that a distance measured in the axial direction from the first axially opposed face to the second axially opposed face is longer than a dimension of the stator core measured in the axial direction. The method includes a holding step of holding the stator core with the two support members, such that, in each of the support members, the first axially opposed face is opposed to the first axial side of the stator core, and the second axially opposed face is opposed to the second axial side of the stator core, and such that the stator core is able to move in the axial direction relative to the two support members, and is unable to be detached from the two support members, and an inverting step of rotating the two support members holding the stator core together at the same time, after the holding step, to move the stator core in the axial direction relative to the two support members, and reverse the orientation of the stator core in the direction of extension of the central axis.

According to the disclosure, the inverting mechanism can reverse the orientation of the stator core along the central axis; therefore, operation or work on the axially opposite sides of the stator during manufacture of the stator can be performed on the upper side of the stator core, for example, and the manufacturing operation can be efficiently performed. Also, cleaning of the stator on the axially opposite sides can be conducted in a condition where the side to be cleaned faces downward, so that foreign substances can be efficiently dispersed vertically downward, and the stator can be efficiently cleaned. Also, the foreign substances can be advantageously prevented from being reattached to the stator core, or the amount of foreign substances thus reattached can be advantageously reduced.

Further, in a condition where the two support members hold the stator core such that the stator core cannot be detached from the support members, the inverting mechanism inverts the two support members, and reverses the orientation of the stator core along the center axis, while allowing the stator core to move relative to the support members in the axial direction. Thus, unlike the manufacturing apparatus of JP 2015-089601 A, the two support members do not grip the stator at certain positions with large force, and no excessive force is applied to the stator core during inversion of the stator core. Thus, the stator core is less likely or unlikely to suffer damage, such as curling, dent, peel-off, etc. of its laminated steel plate.

According to the disclosure, it is possible to invert the stator core while curbing damage of the stator core.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

One embodiment according to this disclosure will be described in detail, with reference to the drawings. When two or more embodiments, modified examples, etc. are included in the following description, it is originally assumed that characteristic portions of the embodiments, etc. may be combined as appropriate to construct a new embodiment or embodiments. Also, in the following embodiment, the same reference signs are assigned to the same components or portions in the drawings, and these components or portions will not be repeatedly described. Also, schematic views are included in the drawings, and the ratio of dimensions, such as the depth, width, and height, of each member is not necessarily identical among different drawings. Also, any constituent element that is not stated in the independent claim indicating the highest conception, among constituent elements that will be described below, is not an essential constituent element, but an optional constituent element. In this specification, when the term "substantially" is used, it is used with the same meaning as "roughly speaking", and the requirement of "substantially . . . " is satisfied if people generally see a condition of "about . . . ", "approximately . . . ", or "roughly . . . ". For example, the requirement of "substantially cylindrical inner circumferential surface" is satisfied, if it generally looks like a cylindrical inner circumferential surface to people. Also, in the following embodiment and modified examples, first support members 10A, 110A, 210A, 310A that constitute pairs of support members 10A, 10B, 110A, 110B, 210A, 210B, 310A, 310B are substantially identical with (or identical with) second support members 10B, 110B, 210B, 310B, respectively; however, the first support member may be different from the second support member. When "axial direction" is mentioned in the following description, it means an axial direction of a stator core. Also, when "radial direction" is mentioned, it means a radial direction of the stator core.

Figure 2:
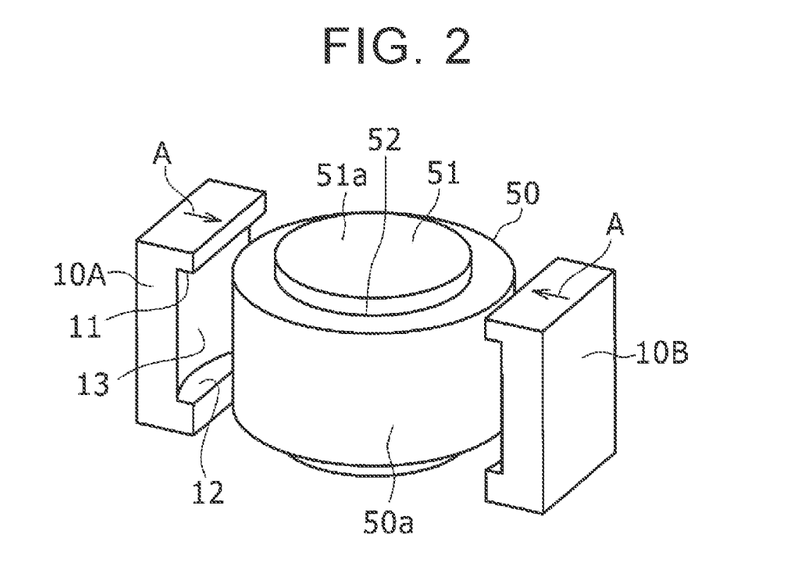
FIG. 2 is a perspective view showing a pair of support members and the stator core during holding operation.
Figure 3:
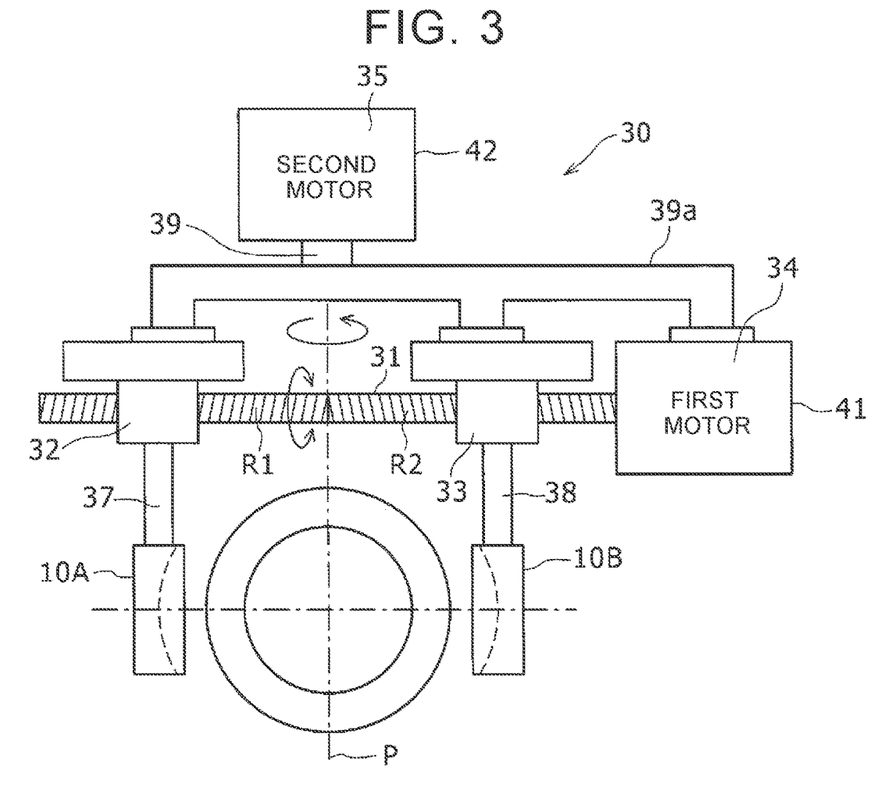
FIG. 3 is a schematic view showing one example of an inverting mechanism capable of adjusting the distance between the opposed support members, and inverting the support members, and is also a plan view showing a condition prior to execution of inverting operation of the inverting mechanism, as viewed from above in the vertical direction.

FIG. 1A to FIG. 1E are schematic front views useful for describing operation to support a stator core 50 and operation to invert the stator core 50, which are performed by a stator core support device 1 according to one embodiment of the disclosure. FIG. 2 is a perspective view showing the stator core 50 and a pair of support members (two support members) 10A, 10B during operation to hold the stator core 50. FIG. 3 is a schematic view illustrating one example of an inverting mechanism 30 capable of adjusting the distance between the support members 10A, 10B opposed to each other, and inverting the support members 10A, 10B. FIG. 3 is also a plan view showing a condition prior to execution of inverting operation of the inverting mechanism 30 as viewed from above in the vertical direction.

Figure 1A:
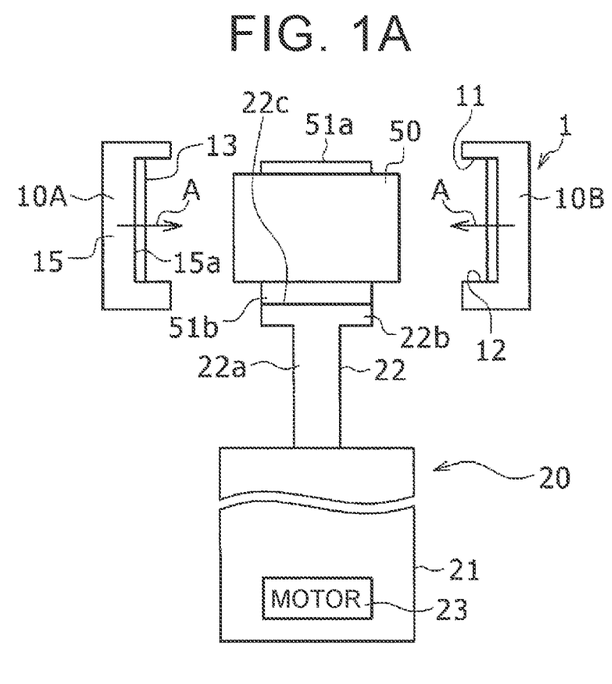
FIG. 1A is a schematic front view useful for describing supporting operation and inverting operation performed on a stator core by a stator core support device according to one embodiment of the disclosure.

As shown in FIG. 1A, the stator core support device 1 includes a pair of support members 10A, 10B, and a mounting device 20. As shown in FIG. 3, the stator core support device 1 further includes the inverting mechanism 30. As shown in FIG. 1A, the mounting device 20 includes a case 21, rod 22, and motor 23, and the rod 22 has a cylindrical shaft portion 22a, and a disk-shaped mounting portion 22b connected to an upper end portion of the shaft portion 22a. A mounting surface 22c that provides an upper surface of the mounting portion 22b is a flat surface that extends substantially in parallel with the horizontal direction, and has a circular shape in a plan view seen from the upper side in the vertical direction, for example.

As shown in FIG. 2, the stator core 50 has a through-hole 52, and a cylindrical holding member 51 is press-fitted in the through-hole 52, for example. As shown in FIG. 1A, the holding member 51 has a first protruding portion 51a that protrudes from a first axial end portion of the stator core 50, to a first side of the axial direction, and a second protruding portion 51b that protrudes from a second axial end portion of the stator core 50, to a second side of the axial direction. Respective distal end faces of the first protruding portion 51a and second protruding portion 51b are provided by flat surfaces substantially perpendicular to the axial direction.

In the condition shown in FIG. 1A, the lower surface that provides the distal end face of the second protruding portion 51b is placed on the mounting surface 22c. The placement is implemented by holding the stator core 50 that has completed a previous process, with a hand (not shown), or the like, and then moving the hand in the vertical direction and horizontal direction, along a predetermined course, for example. In this embodiment, the support members 10A, 10B are adapted to hold the stator core 50 having a central axis that extends substantially in parallel with the vertical direction.

More specifically, as shown in FIG. 1A, in a condition where the second protruding portion 51b of the holding member 51 is mounted at a predetermined position on the mounting surface 22c, the support members 10A, 10B are positioned so as to be radially opposed to the stator core 50, with the central axis of the stator core 50 interposed between the support members 10A, 10B. Each of the support members 10A, 10B has a first axially opposed face 11, a second axially opposed face 12, and a radially opposed face 13. The first axially opposed face 11 and second axially opposed face 12 extend in directions substantially perpendicular to the axial direction of the stator core 50, and the radially opposed face 13 is radially opposed to a cylindrical outer circumferential surface 50a of the stator core 50.

The axial distance between the first axially opposed face 11 and the second axially opposed face 12 is longer than the axial dimension of the stator core 50. As shown in FIG. 2, the radially opposed face 13 is an arc face included in a cylindrical inner circumferential surface having a slightly larger inside diameter than the outside diameter of the outer circumferential surface of the stator core 50. In each of the support members 10A, 10B, the coefficient of kinetic friction of the radially opposed face 13 is smaller than that of the first axially opposed face 11, and is smaller than that of the second axially opposed face 12. More specifically, in this embodiment, the radially opposed face 13 is formed by subjecting a main-body radially opposed face 15a of a main body 15 made of steel, of each support member 10A, 10B, to surface treatment for improvement of its sliding property, as shown in FIG. 1A. The radially opposed face 13 may be a surface of a diamond-like carbon (DLC) formed on the main-body radially opposed face 15a, or may be a surface of a KANIFLON plating film formed by subjecting the main-body radially opposed face 15a to KANIFLON plating (electroless nickel coating with PTFE particles), or may be a surface of a plasma nitride film formed by subjecting the main-body radially opposed face 15a to plasma nitridation. In this connection, each of the support members may be formed of the same material, and only the radially opposed face may be subjected to buffing, so that the coefficient of kinetic friction of the radially opposed face becomes smaller than that of the first and second axially opposed faces.

As shown in FIG. 1A, the first support member 10A and second support member 10B that constitute the pair of support members 10A, 10B simultaneously move in directions indicated by arrows A, so that the distance from the central axis of the stator core 50 becomes substantially equal. More specifically, as shown in FIG. 3, the inverting mechanism 30 has a shaft portion 31 having a male screw, first nut 32, second nut 33, first motor 34, and second motor 35. The shaft portion 31 extends substantially in parallel with a direction (radial direction) in which the support members 10A, 10B are opposed to each other, and has a first region R1 and a second region R2 delimited by a virtual plane P across which the support members 10A, 10B are symmetrical. In the shaft portion 31, the threading direction of the male screw in the first region R1 is opposite to that of the male screw in the second region R2.

The first nut 32 is engaged with the male screw located in the first region R1, and the second nut 33 is engaged with the male screw located in the second region R2. The first nut 32 is connected to the first support member 10A via a first linking portion 37, and the second nut 33 is connected to the second support member 10B via a second linking portion 38.

The first motor 34 is connected to one longitudinal end of the shaft portion 31 in a direction in which the shaft portion 31 extends, and is operable to rotate the shaft portion 31 while controlling the number of rotations and the rotational direction.

On the other hand, a rotary shaft 39 of the second motor 35 extends in a direction that is substantially perpendicular to the central axis of the shaft portion 31 and is included in the virtual plane P. In a condition before the inverting mechanism 30 performs inverting operation, the central axis of the rotary shaft 39 of the second motor 35 exists at substantially the same level in the vertical direction as the central axis of the shaft portion 31. A turning base portion 39a is fixed to the rotary shaft 39 of the second motor 35, and the turning base portion 39a has three shaft portions that are spaced from each other, and extend substantially in parallel with the rotary shaft 39. A first shaft portion of the turning base portion 39a is fixed to a case 41 of the first motor 34. A distal end face of a second shaft portion of the turning base portion 39a is in contact with the first nut 32, and a distal end face of a third shaft portion of the turning base portion 39a is in contact with the second nut 33. Here, the first nut 32 is in contact with the distal end face of the second shaft portion such that the first nut 32 is slidable in the axial direction of the shaft portion 31, and the second nut 33 is in contact with the distal end face of the third shaft portion such that the second nut 33 is slidable in the axial direction of the shaft portion 31. When the turning base portion 39a is rotated by the second motor 35, the shaft portion 31, first nut 32, second nut 33, and first motor 34 make turns. The turning base portion 39a prevents the first nut 32 and the second nut 33 from rotating together when the shaft portion 31 rotates. A case 42 of the second motor 35 is fixed to a stationary part that stands still against a building, for example.

With this arrangement, when the stator core 50 is held by the pair of support members 10A, 10B before the inverting operation, the first motor 34 is driven, so that the first support member 10A connected to the first nut 32 via the first linking portion 37 moves in one direction at a given vertical position, and the second support member 10B connected to the second nut 33 via the second linking portion 38 also moves in one direction at the given vertical position. In a condition prior to the inverting operation of the inverting mechanism 30, the vertical position of the central axis of the rotary shaft 39 of the second motor 35 is only required to be included in the range of vertical position or level in which the support members 10A, 10B exist. However, in the condition prior to the inverting operation of the inverting mechanism 30, the vertical position of the central axis of the rotary shaft 39 of the second motor 35 is preferably set to an intermediate vertical position between the upper limit and lower limit of the level range in which the support members 10A, 10B exist, because the vertical positions of the support members 10A, 10B before turning of the support members 10A, 10B match those of the support members 10A, 10B after turning, as will be described later.

The number of rotations and rotational direction of the first motor 34, and the number of rotations of the second motor 35 are controlled by signals from a control device (not shown). The control device has a storage unit. The storage unit stores information on the number of rotations of the first motor 34, information on the rotational direction of the first motor 34, information on the number of rotations of the second motor 35, information on the operation timing of the first motor 34, information on the operation timing of the second motor 35, and so forth.

Referring again to FIG. 1A, the mounting device 20 includes a servo cylinder (electric cylinder), and the number of rotations of the motor 23 is controlled by a control device (not shown), so that the servo cylinder extends or contracts the rod 22 that protrudes from the case 21, or keeps the rod 22 still. For example, the servo cylinder converts rotation of the motor 23 into linear motion by means of a ball screw, and the control device controls the number of rotations of the motor 23, so as to accurately control the position of the rod 22. The motor 23 of the mounting device 20 is fixed to a stationary part that stands still against a building, for example. In this connection, the first motor 34, second motor 35, and motor 23 of the mounting device may be controlled by a single control device, or controlled by two or more control devices. Also, the mounting device may control extension/contraction and stop of the rod, by means of a hydraulic cylinder, or an air cylinder, for example, in place of the servo cylinder.

Figure 1B:
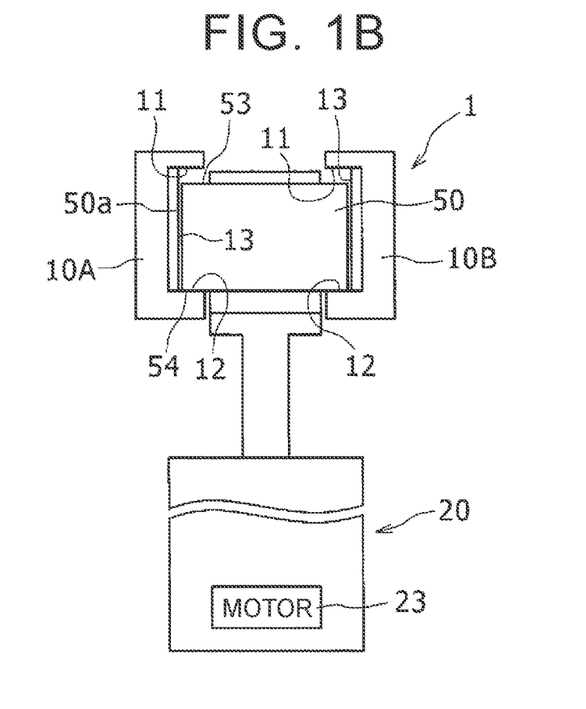
FIG. 1B is a schematic front view useful for describing supporting operation and inverting operation performed on the stator core by the stator core support device.

The stator core support device 1 configured as described above is operable to invert the stator core 50 in the following manner. Initially, as shown in FIG. 1A, the position of the rod 22 of the mounting device 20 is controlled to a first predetermined level. Then, as shown in FIG. 1B, the support members 10A, 10B are moved to predetermined positions in the directions of arrows A, to approach each other. More specifically, referring to FIG. 3, the first motor 34 is driven, so as to rotate the shaft portion 31 in a first rotational direction by a predetermined number of rotations. As described above, in the shaft portion 31, the threading direction of the male screw in the first region R1 is opposite to that of the male screw in the second region R2; therefore, the support members 10A, 10B can be moved to the predetermined positions to get closer to the stator core 50, through operation of the shaft portion 31. In this embodiment, the support members 10A, 10B are linearly moved in opposite directions, by use of the structure of right and left screws. However, any other known structure, such as the structure of an air chuck or a hydraulic chuck, may be used, namely, a pair of support members may be linearly moved in opposite directions, by use of the air pressure or hydraulic pressure, for example.

The above-mentioned predetermined positions substantially coincide with positions at which the radially opposed face 13 (arc face) of the first support member 10A and the radially opposed face 13 (arc face) of the second support member 10B are located on the same cylindrical inner circumferential surface. Thus, since the inside diameter of the cylindrical inner circumferential surface is slightly larger than the outside diameter of the stator core 50, slight radial clearances exist between the radially opposed faces 13, 13, and the outer circumferential surface of the stator core 50, as shown in FIG. 1B. Also, in the condition shown in FIG. 1B, the first axially opposed face 11 located on the vertically upper side in each of the support members 10A, 10B is opposed to a first axial end face 53 of the stator core 50 in the axial direction, via a clearance, and the second axially opposed face 12 located on the vertically lower side in each support member 10A, 10B is in contact with a second axial end face 54 of the stator core 50.

Figure 1C:
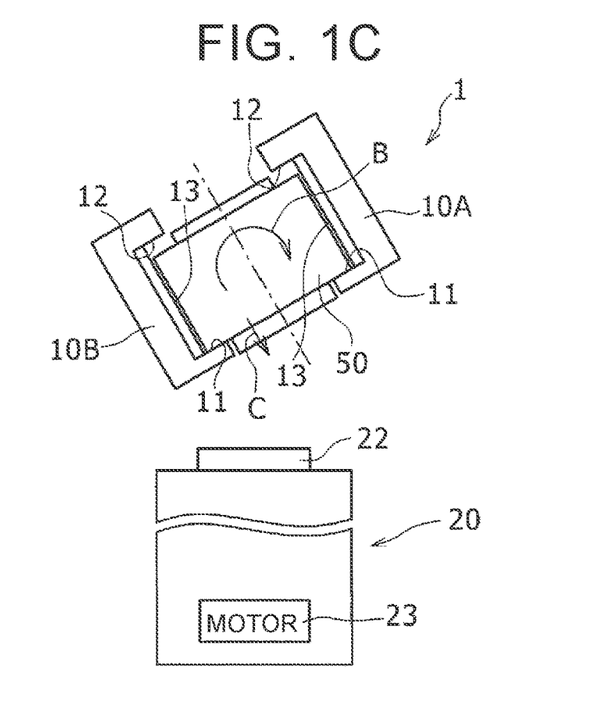
FIG. 1C is a schematic front view useful for describing supporting operation and inverting operation performed on the stator core by the stator core support device.
Figure 1D:
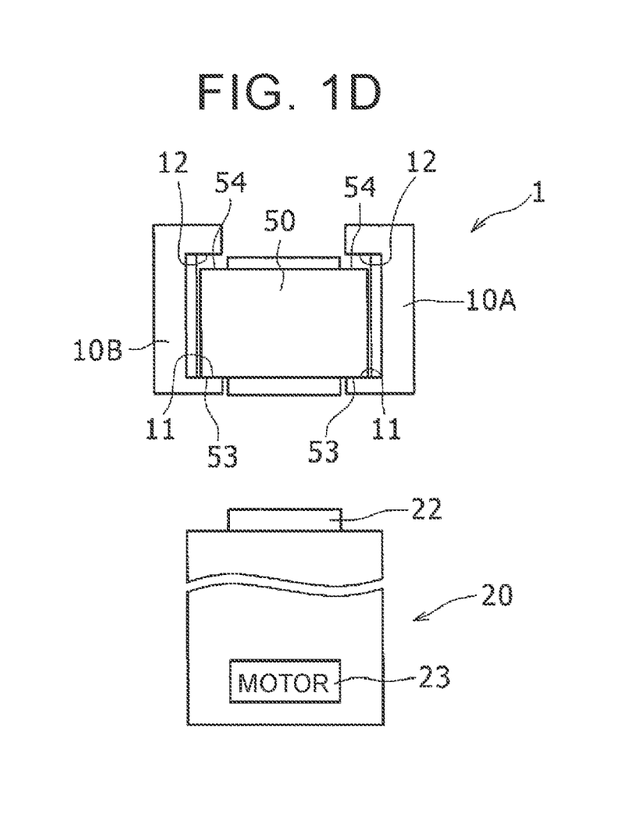
FIG. 1D is a schematic front view useful for describing supporting operation and inverting operation performed on the stator core by the stator core support device.

Subsequently, as shown in FIG. 1C, the rod 22 of the mounting device 20 is moved downward, to a position at which the rod 22 does not contact the support members 10A, 10B even when the support members 10A, 10B make turns. Then, the support members 10A, 10B are turned about the central axis of the rotary shaft 39 of the second motor 35 (see FIG. 3), so that the support members 10A, 10B are inverted vertically, as shown in FIG. 1D. This can be easily accomplished by rotating the rotary shaft 39 of the second motor 35 by a predetermined number of rotations. Although not illustrated in the drawings, when the support members 10A, 10B are turned, the shaft portion 31 having the male screw, first nut 32, second nut 33, and first motor 34 are also turned.

Figure 8:
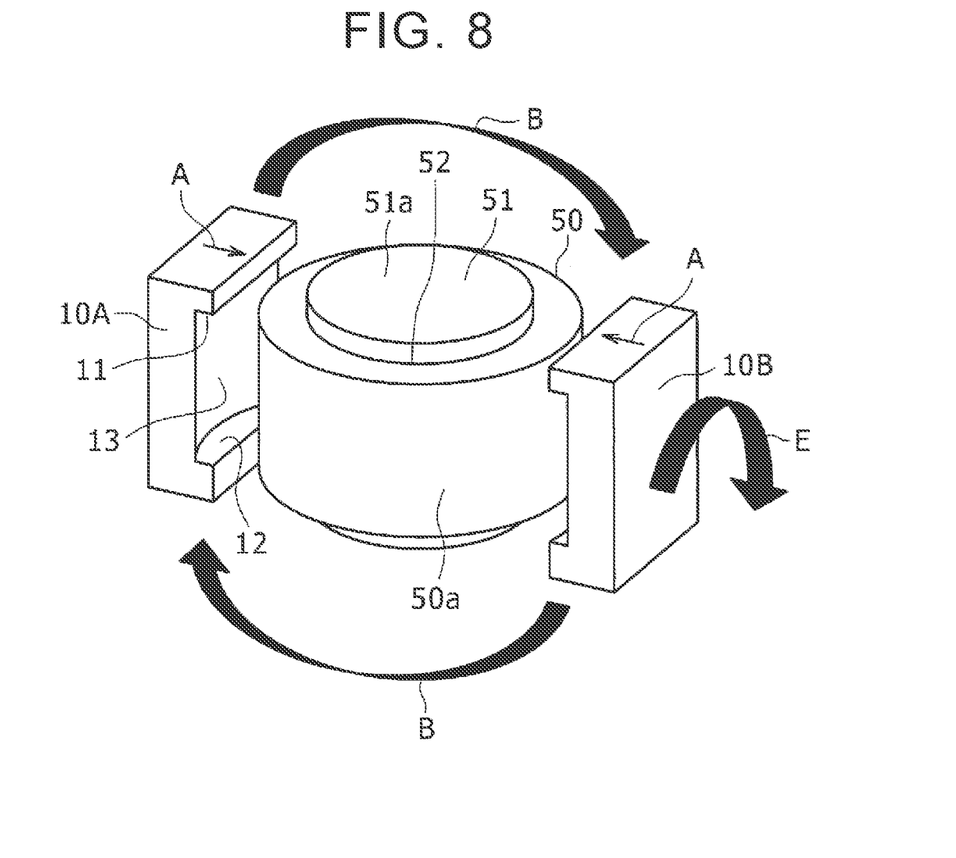
FIG. 8 is a view useful for describing directions in which two support members can be inverted.

Since slight radial clearances exist between the radially opposed faces 13, 13 and the cylindrical outer circumferential surface 50a of the stator core 50, in the condition shown in FIG. 1B, a radial clearance exists between at least one of the radially opposed faces 13, 13 and the stator core 50, during inversion of the support members 10A, 10B. As a result, while the support members 10A, 10B are being inverted in a direction indicated by arrow B in FIG. 1C, the stator core 50 axially moves in a direction indicated by arrow C in FIG. 1C, relative to the support members 10A, 10B. Then, in a condition as shown in FIG. 1D, in which the support members 10A, 10B are vertically inverted, the second axially opposed face 12 located on the vertically upper side of each support member 10A, 10B is opposed in the axial direction to the second axial end face 54 of the stator core 50, via a clearance, and the first axially opposed face 11 located on the vertically lower side of each support member 10A, 10B contacts with the first axial end face 53 of the stator core 50. While the second motor 35 is used for turning the support members 10A, 10B in this embodiment, the support members may be configured to be turned by human hand, using a handle, for example. Referring now to FIG. 8, the inversion direction indicated by the arrow B means direction of rotation of the support members 10A, 10B about a normal to the central axis of the stator core 50. The support members 10A, 10B may be rotated in this manner, to be inverted such that the positions of the two support members 10A, 10B change. Alternatively, the support members 10A, 10B may be inverted, as indicated by arrow E in FIG. 8, so as to change only the positions of the first axially opposed face 11 and second axially opposed face 12, without changing the positions of the two support members 10A, 10B.

Figure 1E:
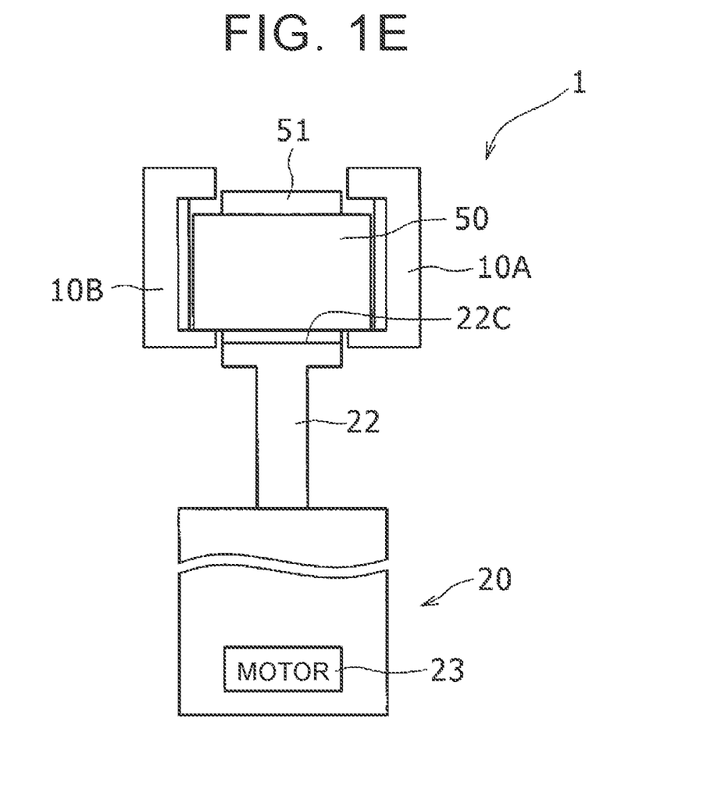
FIG. 1E is a schematic front view useful for describing supporting operation and inverting operation performed on the stator core by the stator core support device.

Finally, as shown in FIG. 1E, the rod 22 of the mounting device 20 is extended by a given length under control of the control device, until the rod 22 contacts with the lower surface of the holding member 51, so that the lower surface of the holding member 51 is supported by the mounting surface 22c of the rod 22. Then, the first motor 34 is rotated in a second rotational direction opposite to the first rotational direction, so that the support members 10A, 10B are moved away from the stator core 50. Thus, the operation to invert the stator core 50 is completed.

The stator core support device 1 of this disclosure includes the two support members 10A, 10B that are radially opposed to the stator core 50 with the central axis of the stator core 50 interposed therebetween, and hold the stator core 50, and the inverting mechanism 30 that rotates the two support members 10A, 10B together at the same time in a condition where the support members 10A, 10B hold the stator core 50, so as to reverse the orientation of the stator core 50 in the direction of extension of its central axis. Also, each of the support members 10A, 10B has the radially opposed face 13 that is radially opposed to the stator core 50, first axially opposed face 11 that is axially opposed to the first axial side of the stator core 50, and second axially opposed face 12 that is axially opposed to the second axial side of the stator core 50. The second axially opposed face 12 is positioned such that the axial distance from the first axially opposed face 11 to the second axially opposed face 12 is longer than the axial dimension of the stator core 50. Also, while the two support members 10A, 10B are being inverted while holding the stator core 50, the stator core 50 is moved in the axial direction relative to the two support members 10A, 10B. Then, the first axially opposed faces 11, 11 contact with the first axial side of the stator core 50, so as to restrict movement of the stator core 50 to the first axial side thereof, relative to the support members 10A, 10B, and the second axially opposed faces 12, 12 contact with the second axial side of the stator core 50, so as to restrict movement of the stator core 50 to the second axial side thereof, relative to the support members 10A, 10B. Namely, the first axially opposed faces 11, 11 and the second axially opposed faces 12, 12 limit the range of axial movement of the stator core 50 relative to the support members 10A, 10B during inversion of the two support members 10A, 10B, so that the stator core 50 is prevented from being detached from the support members 10A, 10B during inversion of the stator core 50.

Accordingly, the inverting mechanism 30 can reverse the orientation of the stator core 50 along its central axis, and the inverting mechanism 30 can vertically invert the stator core 50, as in this embodiment, so that operation or work on the axially opposite sides of the stator during manufacture of the stator can be both done on the upper side of the stator core 50, and manufacturing operation can be efficiently carried out. Also, cleaning of the stator on the axially opposite sides of the stator can be both done in a condition where either side to be cleaned faces downward; therefore, foreign substances can be efficiently dispersed vertically downward, and the stator can be efficiently cleaned. Also, the foreign substances are advantageously prevented from being reattached to the stator, or the amount of foreign substances thus reattached can be reduced.

While the two support members 10A, 10B are holding the stator core 50 such that the stator core 50 cannot be detached from the support members 10A, 10B, the inverting mechanism 30 inverts the two support members 10A, 10B, and vertically inverts the stator core 50 while moving the stator core 50 in the axial direction relative to the support members 10A, 10B. Accordingly, unlike the manufacturing apparatus of JP 2015-089601 A, the two support members 10A, 10B do not hold the stator core 50 at certain positions with large force, and no excessive force is applied to the stator core 50 during inversion of the stator core 50. Thus, the stator core 50 is less likely or unlikely to suffer damage, such as curling, dent, peel-off, etc. of the laminated steel plate.

Further, in the stator core support device 1, the stator core 50 is axially moved relative to the support members 10A, 10B when the support members 10A, 10B are inverted, and the support members 10A, 10B do not hold the stator core 50 such that the axial movement of the stator core 50 relative to the support members 10A, 10B is inhibited. Accordingly, the structure of the stator core support device 1 can be significantly simplified, as compared with a stator core support device that inhibits axial movement of the stator core relative to the support members, as will be described below.

Figure 4:
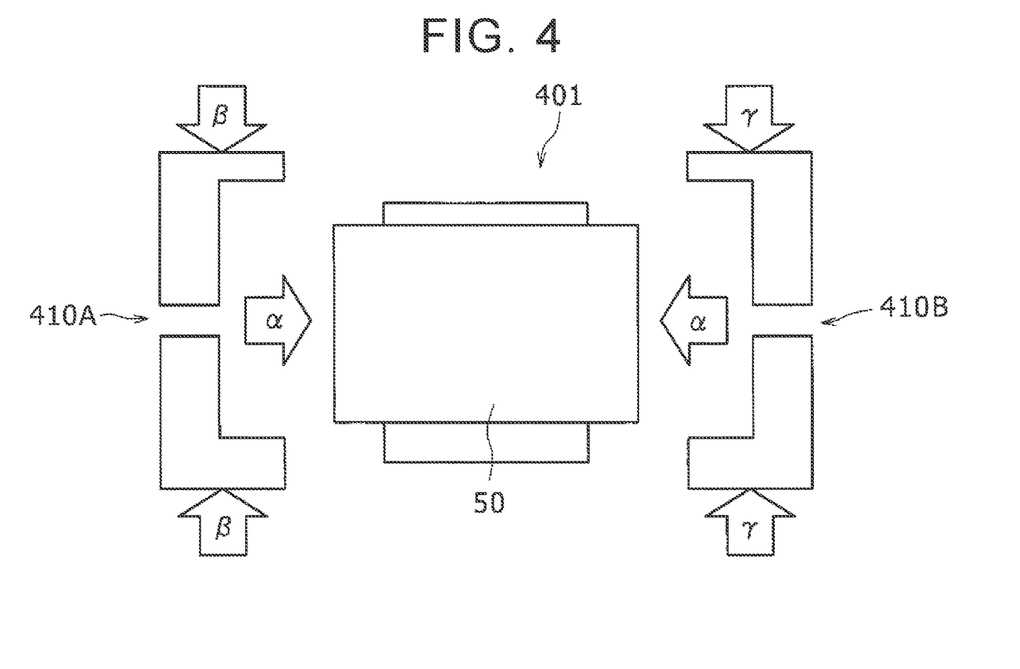
FIG. 4 is a view useful for describing supporting operation of a stator core support device of a reference example in which relative movement of a stator core in the axial direction is inhibited.

Referring to FIG. 4, supporting operation of a stator core support device 401 of a reference example in which the relative movement of the stator core 50 in the axial direction is inhibited will be described. As shown in FIG. 4, in the stator core support device 401, a pair of support members 410A, 410B needs to be moved so as to grip the stator core 50 in the axial direction when holding the stator core 50, and a three-axis operating part is needed for extending and contracting the support members 410A, 410B in α directions, β directions, and γ directions. On the other hand, in the stator core support device 1, there is no need to grip the stator core 50 in the axial direction; therefore, it is merely required to move the support members 10A, 10B only in the β directions as radial directions, when holding the stator core 50. In other words, in the stator core support device 1 of this disclosure, the support members 10A, 10B are configured to have a cylindrical groove having a width (axial width) that is larger than the thickness (axial dimension) of the stator core 50; therefore, the support members 10A, 10B can be opened and closed through single-axis operation of right and left screws, so as to hold the stator core 50. Accordingly, the structure of the operating part for holding the stator core 50 can be significantly simplified.

Also, as in the above embodiment, the inverting mechanism 30 may invert the two support members 10A, 10B that hold the stator core 50 having the central axis extending substantially in parallel with the vertical direction, and the two support members 10A, 10B may hold the stator core 50 in a condition where the stator core 50 can be radially moved relative to the two support members 10A, 10B.

With this arrangement, the stator can be manufactured in a condition where the central axis of the stator core 50 is substantially in parallel with the vertical direction. Accordingly, operation or work can be performed on axially opposite end portions of the stator, right above or right below the stator, so that the stator can be efficiently manufactured. Also, since the stator core 50 can radially move relative to the two support members 10A, 10B, it is possible to significantly reduce kinetic friction force applied from the radially opposed faces to the stator core 50 when the stator core 50 axially moves relative to the support members 10A, 10B (when the stator core 50 is inverted), and significantly reduce the risk of damaging the stator core 50.

In the illustrated embodiment, the support members 10A, 10B are inverted from a condition where the central axis of the stator core 50 is substantially in parallel with the vertical direction. However, the support members 10A, 10B may be inverted from a condition where the central axis of the stator core 50 is inclined by an angle other than 90 degrees with respect to the horizontal direction. Also, in a condition where the stator core support members are holding the stator core, the support members may be configured to contact with the stator core, and the coefficient of static friction of the radially opposed faces of the support members may be equal to or smaller than the upper limit of values at which the stator core moves in the axial direction relative to the support members when the support members are inverted.

In each of the support members, the kinetic friction coefficient of the radially opposed face may be equal to or larger than that of the first axially opposed face, and may be equal to or larger than that of the second axially opposed face. However, when the kinetic friction coefficient of the radially opposed face 13 is smaller than that the kinetic friction coefficient of the first axially opposed face 11, and is also smaller than the kinetic friction coefficient of the second axially opposed face 12 in each of the support members 10A, 10B, as in the above embodiment, the stator core 50 can smoothly slide relative to the two support members 10A, 10B during inversion of the stator core 50, and the stator core 50 can be substantially prevented or prevented from being damaged.

Also, the method of supporting the stator core according to this disclosure uses the stator core support device 1 including the two support members 10A, 10b that are radially opposed to the stator core 50 with the central axis of the stator core 50 interposed therebetween, and hold the stator core 50, and the inverting mechanism 30 that rotates the two support members 10A, 10B together at the same time while the stator core 50 is being held, to reverse the orientation of the stator core 50 in the direction of extension of its central axis. Each of the support members 10A, 10B has the radially opposed face 13 that is radially opposed to the stator core 50, first axially opposed face 11 that is axially opposed to the first axial side of the stator core 50, and second axially opposed face 12 that is axially opposed to the second axial side of the stator core 50. The second axially opposed face 12 is positioned such that the axial distance from the first axially opposed face 11 to the second axially opposed face 12 is longer than the axial dimension of the stator core 50. Also, the stator core supporting method of this disclosure includes a holding step of holding the stator core 50 with the two support members 10A, 10B, such that, in each of the support members 10A, 10B, the first axially opposed face 11 is opposed to the first axial side of the stator core 50, and the second axially opposed face 12 is opposed to the second axial side of the stator core 50, and such that the stator core 50 is able to axially move relative to the two support members 10A, 10B, and is unable to be detached from the two support members 10A, 10B. Also, the stator core supporting method of this disclosure includes an inverting step of rotating the two support members 10A, 10B holding the stator core 50 together at the same time, after the holding step, to axially move the stator core 50 relative to the two support members 10A, 10B, and reverse the orientation of the stator core 50 in the direction of extension of its central axis. With the method of supporting the stator core 50 according to the disclosure, it is possible to invert the stator core 50 while curbing damage, like the stator core support device 1.

This disclosure is not limited to the above embodiment and its modified examples, but they may be improved or changed in various ways, within the range of matters described in the appended claims and their equivalents.

Figure 5:
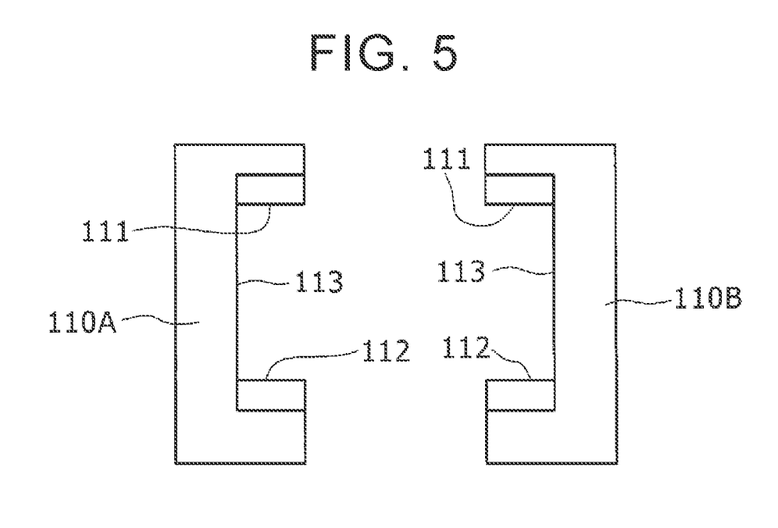
FIG. 5 is a schematic front view showing a pair of support members of a modified example.

For example, as shown in FIG. 5, i.e., the schematic front view showing a pair of support members 110A, 110B of a modified example, in each of the support members 110A, 110B, the impact-absorbing capability of the first axially opposed face 111 may be higher than that of the radially opposed face 113, and the impact-absorbing capability of the second axially opposed face 112 may be higher than that of the radially opposed face 113. This arrangement may be realized by coating the first axially opposed face 111 and second axially opposed face 112 with resin or plating the first axially opposed face 111 and second axially opposed face 112 with urethane, in each of the support members 110A, 110B.

The impact-absorbing capability may be objectively determined according to the following method. Specifically, with regard to the first axially opposed face, second axially opposed face, or radially opposed face, a plate-like member made of the same material and the same thickness as each opposed face is attached onto a floor, and the same spherical member (e.g., a bouncy rubber ball called "superball") is caused to freely fall in parallel with the vertical direction, from the same level, with no initial velocity given thereto. Then, the level reached by the spherical member is measured (the rebound coefficient is measured) when the spherical member collides with the plate-like member and rebounds. The impact-absorbing capability may be determined to be higher as the level reached by the rebounding spherical member is lower.

With this arrangement, the impact generated when the stator core 50 collides with the first axially opposed face 111 (or second axially opposed face 112) during inversion of the support members 110A, 110B is likely to be absorbed by the first axially opposed face 111 (or second axially opposed face 112). Thus, the stator core 50 is less likely or unlikely to be damaged when the stator core 50 collides with the first axially opposed face 111 (or second axially opposed face 112). It is, however, to be noted that this arrangement may not be employed, but the first axially opposed face, second axially opposed face, and radially opposed face may be formed of the same material, and may have the same impact-absorbing capability, for example.

Figure 6A:
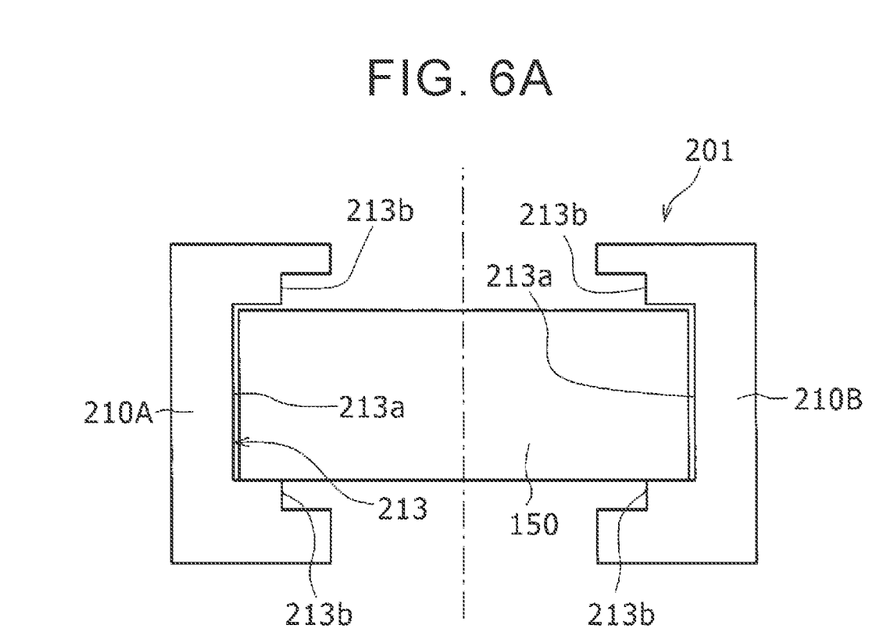
FIG. 6A is a schematic front view showing a pair of support members of another modified example, and showing a condition where the support members hold a stator core.
Figure 6B:
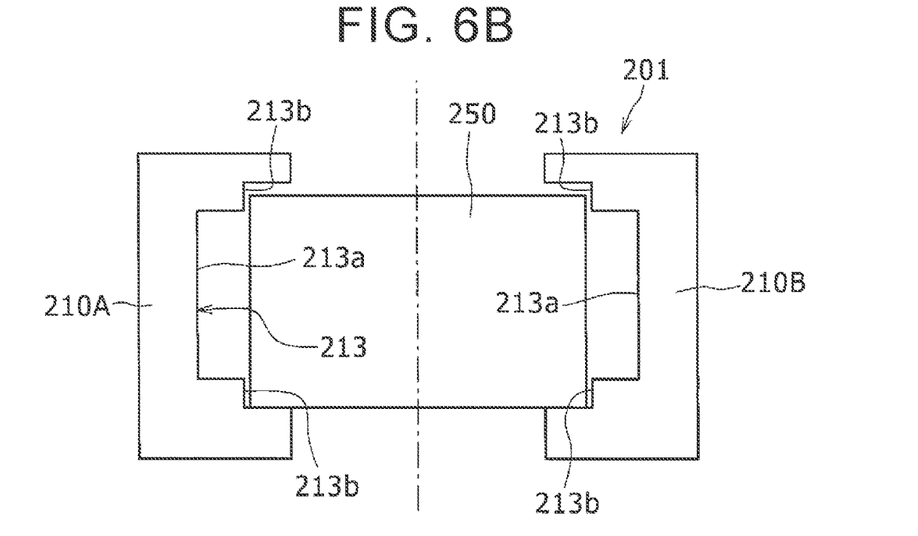
FIG. 6B is a schematic front view corresponding to FIG. 6A, showing a condition where the support members shown in FIG. 6A hold a stator core having a larger thickness than the stator core shown in FIG. 6A.

As shown in FIG. 6A and FIG. 6B, i.e., the schematic front views each showing a pair of support members 210A, 210B of another modified example, in each of the support members 210A, 210B, the radially opposed face 213 may include a first cylindrical face (more accurately, arc face) 213a provided by a part of a first cylindrical inner circumferential surface having a first radius of curvature, and two second cylindrical faces (more accurately, arc faces) 213b, 213b that are formed on the axially opposite sides of the first cylindrical face, and are provided by parts of a second cylindrical inner circumferential surface having a second radius of curvature that is smaller than the first radius of curvature.

With this arrangement, a stator core 150 having an outside radius that is substantially equal to the first radius of curvature can be held by use of the first cylindrical face 213a, as shown in FIG. 6A, and a stator core 250 having an outside radius that is substantially equal to the second radius of curvature can be held by use of the two second cylindrical faces 213b, 213b, as shown in FIG. 6B. Thus, two or more stator cores 150, 250 having different radii can be supported by the stator core support device 201, and the versatility of the stator core support device 201 can be enhanced.

The case where each of the two support members 210A, 210B has the first cylindrical face 213a and the second cylindrical faces 213b has been described. However, only one of the support members may have the first cylindrical face and the second cylindrical faces. For example, when one of the support members has a stepped radially opposed face including two or more cylindrical faces, the radially opposed face of the other support member may be formed as a flat surface. Also, the case where each of the radially opposed faces 213, 213 of the support members 210A, 210B is formed in a two-stage stepped shape, and the radially opposed face 213 has the cylindrical faces 213a, 213b having two different radii of curvature, has been described. However, in at least one of the support members, the radially opposed face of the support member may be formed in a stepped shape having three or more stages, so that the radially opposed face has cylindrical faces having three or more different radii of curvature, and the support members may support three or more different types of stator cores.

Figure 7A:
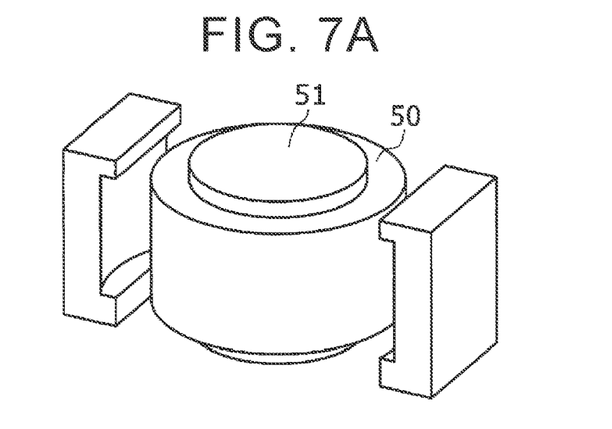
FIG. 7A is a perspective view showing a pair of support members.
Figure 7B:
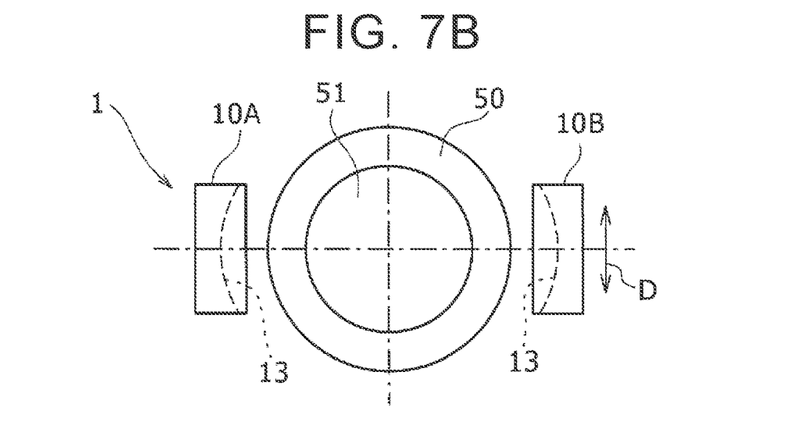
FIG. 7B is a schematic plan view showing the pair of support members of the embodiment shown in FIG. 1A, as viewed from above.
Figure 7C:
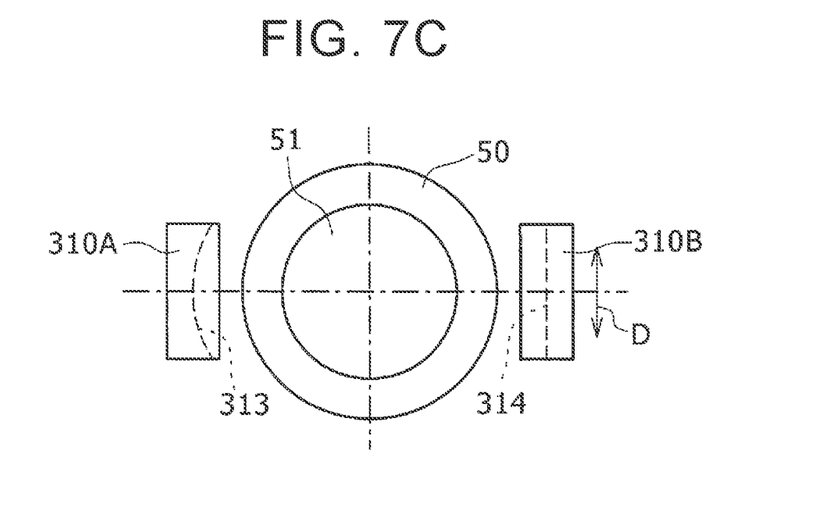
FIG. 7C is a schematic plan view showing a pair of support members of another modified example, as viewed from above.

The perspective view of FIG. 7A shows the stator core support device 1 of the illustrated embodiment, while the plan view of FIG. 7B shows the same device 1 including the support members 10A, 10B, as viewed from above. In the illustrated embodiment, the radially opposed faces 13, 13 of the respective support members 10A, 10B are arcuate faces. However, the two support members may be those shown in the perspective view of FIG. 7A, and the plan view of FIG. 7C when viewed from above. Namely, a radially opposed face 313 of a first support member 310A as one of two support members 310A, 310B may be an arc face, while a radially opposed face 314 of the second support member 310B as the other of the two support members 310A, 310B may be a flat face. More specifically, in the plan view as seen from above in the vertical direction, the radially opposed face 314 of the support member 310B may extend in a direction substantially perpendicular to one direction (radial direction) in which the first support member 310A and the second support member 310B are opposed to each other.

When both of the radially opposed faces 13, 13 of the two support members 10A, 10B are arc faces provided by parts of the cylindrical inner circumferential surface, as shown in FIG. 7B, the support members 10A, 10B can stably support the stator core 50, but both of the radially opposed faces 13, 13 of the two support members 10A, 10B need to be placed on the same cylindrical inner circumferential surface with high accuracy, and the second support member 10B needs to be precisely positioned relative to the first support member 10A in the direction of arrow D (direction perpendicular to the radial direction in which the first support member 10A and the second support member 10B are opposed to each other). On the other hand, with the above arrangement, the radially opposed face 314 of the one support member 310B is a flat face; therefore, the permissible range of the position of the one support member 310B relative to the other support member 310A in the direction of arrow D can be expanded, which makes it unnecessary to align the two support members 310A, 310B with each other with high accuracy. Consequently, positioning of the two support members 310A, 310B can be far easily accomplished.

What is claimed is:

1. A stator core support device comprising:
   two support members that are configured to hold a stator core, and are radially opposed to the stator core such that a central axis of the stator core is interposed between the support members; and
   an inverting mechanism configured to rotate the two support members together at the same time while the support members are holding the stator core, to reverse an orientation of the stator core in a direction of extension of the central axis,
   wherein each of the support members has a radially opposed face that is radially opposed to the stator core, a first axially opposed face that is opposed to a first axial side of the stator core in an axial direction of the stator core, and a second axially opposed face that is opposed to a second axial side of the stator core in the axial direction, the second axially opposed face being positioned such that a distance measured in the axial direction from the first axially opposed face to the second axially opposed face is longer than a dimension of the stator core measured in the axial direction,
   wherein the stator core is configured to be moved in the axial direction relative to the two support members, while the two support members are being inverted while holding the stator core, and
   wherein the first axially opposed face is configured to contact with the first axial side of the stator core, to restrict movement of the stator core to the first axial side, relative to the support members, and the second axially opposed face is configured to contact with the second axial side of the stator core, to restrict movement of the stator core to the second axial side, relative to the support members.

2. The stator core support device according to claim 1, wherein:
   the inverting mechanism is configured to invert the two support members that hold the stator core of which the central axis extends substantially in parallel with a vertical direction; and
   the two support members are configured to hold the stator core such that the stator core is able to radially move relative to the two support members.

3. The stator core support device according to claim 1, wherein, in each of the support members, a coefficient of kinetic friction of the radially opposed face is smaller than that of the first axially opposed face, and is smaller than that of the second axially opposed face.

4. The stator core support device according to claim 1, wherein, in each of the support members, an impact-absorbing capability of the first axially opposed face is higher than that of the radially opposed face, and the impact-absorbing capability of the second axially opposed face is higher than that of the radially opposed face.

5. The stator core support device according to claim 1, wherein the radially opposed face of at least one of the support members includes a first cylindrical face provided by a part of a first cylindrical inner circumferential surface having a first radius of curvature, and two second cylindrical faces formed on opposite sides of the first cylindrical face in the axial direction, each of the second cylindrical faces being provided by a part of a second cylindrical inner circumferential surface having a second radius of curvature that is smaller than the first radius of curvature.

6. The stator core support device according to claim 1, wherein the radially opposed face of one of the two support members is a flat face.

7. A method of supporting a stator core, using a stator core support device including two support members that are configured to hold a stator core, and are radially opposed to the stator core such that a central axis of the stator core is interposed between the support members, and an inverting mechanism configured to rotate the two support members together at the same time while the support members are holding the stator core, to reverse an orientation of the stator core in a direction of extension of the central axis, wherein each of the support members has a radially opposed face that is radially opposed to the stator core, a first axially opposed face that is opposed to a first axial side of the stator core in an axial direction of the stator core, and a second axially opposed face that is opposed to a second axial side of the stator core in the axial direction, the second axially opposed face being positioned such that a distance measured in the axial direction from the first axially opposed face to the second axially opposed face is longer than a dimension of the stator core measured in the axial direction, the method comprising:
   a holding step of holding the stator core with the two support members, such that, in each of the support members, the first axially opposed face is opposed to the first axial side of the stator core, and the second axially opposed face is opposed to the second axial side of the stator core, and such that the stator core is able to move in the axial direction relative to the two support members, and is unable to be detached from the two support members; and
   an inverting step of rotating the two support members holding the stator core together at the same time, after the holding step, to move the stator core in the axial direction relative to the two support members, and reverse the orientation of the stator core in the direction of extension of the central axis.

* * * * *